United States Patent Office 3,201,383
Patented Aug. 17, 1965

3,201,383
METALLIZED MONOAZO DYES
James M. Straley and Raymond C. Harris, Kingsport, Tenn., assignors to Eastman Kodak Company, Rochester, N.Y., a corporation of New Jersey
No Drawing. Filed July 5, 1962, Ser. No. 207,792
6 Claims. (Cl. 260—147)

This invention relates to a class of metallized monoazo compounds obtained by metallizing the dyes obtained by coupling the diazo salt of N-γ-dialkylaminoalkyl-4-methoxy-3-aminobenzenesulfonamides with 5-pyrazolones free of carboxylic and sulfonic acid radicals yielding compounds imparting fast yellow shades particularly to acrylic fibers. The metallized dyes are characterized by producing shades on these fibers more fast than obtained with the dyes in the metal-free state.

While our invention relates broadly to the metallized monoazo compounds, a preferred group of metallized compounds are the nickel, cobalt, chromium and copper complex unions with two moles of azo dyes having the following general formula:

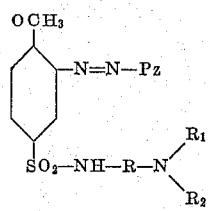

wherein Pz represents a 4-pyrazolyl-5-one radical free of carboxy and sulfo groups and preferably containing a phenyl radical in the 1-position e.g. phenyl, β-hydroxyethylphenyl, chlorophenyl, tolyl, methoxyphenyl, nitrophenyl and cyanophenyl. The 3-position of the pyrazolyl nuclous may likewise be substituted with e.g. branched or straight-chain lower alkyl such as methyl, ethyl, propyl and iso-butyl, lower alkoxy such as methoxy, and butoxy and phenyl radicals as above. R represents a lower alkylene group preferably straight chained, such as methyl, ethyl, propyl and butyl. $R_1$ and $R_2$ are lower alkyl radicals including methyl, ethyl, propyl and butyl and together with the nitrogen atom to which they are attached represent the atoms necessary to complete a reduced heterocyclic radical such as morpholino and piperidino radicals.

The metallized monoazo compounds of our invention are prepared by treating the non-metallized monoazo compounds with for example salts of nickel, cobalt, copper, chromium, manganese, iron or vanadium. The non-metallized monoazo compounds can be metallized either on or off the fiber. Metallization can be carried out, for example, by treating the non-metallized dye with a solution or dispersion of the metallizing agent. Although the metal complex is often formed at room temperature, we prefer to accelerate the process by heating, usually with steam, for a short time. The preparation of the metallized monoazo compounds of our invention is fully described hereinafter.

Illustrative of the metallizing agents that can be employed are the halides, the sulfates, the acetates, the cyanides, and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate $[Ni(SCN)_2]$, cobaltous bromide, cobaltic chloride, cobaltous chloride, cobaltous acetate, cobaltous cyanide, cobalt thiocyanate $$[Co(SCN)_2]$$

cupric chloride, cupric acetate, cupric lactate, chromium trichloride, chromium tribromide chromic sulfate, chromic acetate, chromium thiocyanate $[Cr(SCN)_3]$, manganese chloride, manganous sulfate, manganese acetate, manganese thiocyanate $[Mn(SCN)_2]$, ferric chloride, ferric fluoride, ferrous acetate, ferrous thiocyanate $$[Fe(SCN)]_2$$

ferric thiocyanate $[Fe(SCN)_3]$ and vanadium thiocyanate $[V(SCN)_2]$ are illustrative of the metallizing agents that can be employed.

5-pyrazoles useful in preparing the monoazo dye are: 3-methyl-5-pyrazolone, 3-carboxy-5-pyrazolone, 3-cabomethoxy-5-pyrazolone, 3-carboethoxy-5-pyrazolone, 3-amino-5-pyrazolone, 3-hydroxy-5-pyrazolone, 3-trifluoromethyl-5-pyrazolone, 1-phenyl-3-methyl-5-pyrazolone, 1-phenyl-3-amino-5-pyrazolone, 1-phenyl-3-hydroxy-5-pyrazolone, 1-(2-benzothiazolyl)-3-amino-5-pyrazolone, 1-phenyl-3-methyl-5-p-nitrophenyl pyrazolone, 3-phenyl-5-pyrazolone, 1-phenyl-3-carbomethoxy-5-pyrazolone, 1-phenyl-3-carbomethoxy-5-pyrazolone, 1,3-dimethyl-5-pyrazolone, 1-p-nitrophenyl-3-methyl-5-pyrazolone, 1-o-nitrophenyl-3-methyl-5-pyrazolone, 1-p-methylphenyl-3-methyl-5-pyrazolone, 1-p-methoxyphenyl-3-amino-5-pyrazolone, 1-p-methylphenyl-3-amino-5-pyrazolone, 1-o-chlorophenyl-3-amino-5-pyrazolone, 1-p-chlorophenyl-3-amino-5-pyrazolone, 1-p-ethylphenyl-3-methyl-5-pyrazolene, 1-p-chlorophenyl-3-methyl-5-pyrazolone, 1-(2-benzothiazoly)-3-methyl-5-pyrazolone, 1-(2-benzothiazolyl)-3-carbomethoxy-5-pyrazolone, 3-isobutyl-1-phenyl-5-pyrazolone, 3-phenyl-1-β-hydroxyethyl-5-pyrazolone and 1-phenyl-3-amino-5-pyrazolone.

Representative sulfonamides useful for diazotization and coupling with the 5-pyrazolones above are as follows:

N-β-diethylaminoethyl-4-methoxy-3-aminobenzene-sulfonamide
N-β-dimethylaminoethyl-4-methoxy-3-aminobenzene-sulfonamide
N-β-dibutylaminoethyl-4-methoxy-3-aminobenzene-sulfonamide
N-β-dimethylaminopropyl-4-methoxy-3-aminobenzene-sulfonamide
N-β-dimethylaminomethyl-4-methoxy-3-amino-benzenesulfonamide
N-β-dipropylaminopropyl-4-methoxy-3-amino-benzenesulfonamide As mentioned above, the metallized dyes are particularly useful for dyeing acrylic fibers such as polyacrylonitrile copolymers of acrylonitrile and graft polymers of acrylonitrile e.g. vinylidene chloride-acrylonitrile copolymers and acrylamide-acrylonitrile copolymers.

The following table shows the colors obtainable by dyeing acrylic fibers with representative metallized [with Ni] dyes of the invention having the above general formula.

| 5-Pyrazolone Used | R | R₁ R₂ | Color |
|---|---|---|---|
| 1,3-diphenyl | —[CH₂]₃— | —C₃H₇ | Yellow. |
| 1-phenyl-3-carboethoxy | —[CH₂]₃— | —CH₃ | Do. |
| 3-carboethoxy | —[CH₂]₃— | —CH₃ | Do. |
| 3-methyl-1-[2,4,6-trichlorophenyl] | —[CH₂]₃— | —CH₃ | Do. |
| 3-isobutyl-1-phenyl | —[CH₂]₃— | —CH₃ | Do. |
| 3-n-propyl | —[CH₂]₃— | —CH₃ | Do. |
| 3-phenyl-1-β-hydroxyethyl | —[CH₂]₃— | —CH₃ | Do. |
| 1-phenyl-3-methyl | —[CH₂]₃— | NR₁R₂= 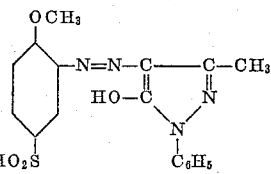 | Do. |
| Do | —[CH₂]₃ | NR₁R₂=N-piperidino | Do. |
| Do | —[CH₂]₃— | —CH₃ | Do. |
| 1-phenyl-3-isobutyl | —[CH₂]₃— | —CH₃ | Do. |
| 1-β-hydroxyethyl-3-phenyl | —[CH₂]₃— | —CH₃ | Do. |
| 3-methyl | —[CH₂]₂— | —C₂H₅ | Do. |
| 1-phenyl-3-amino | —[CH₂]₂— | —CH₃ | Do. |

The following examples will serve to illustrate our invention.

*Example 1*

Three and seven tenths grams [0.01 m.] of N-α-dimethylaminopropyl-4-methoxy-3-amino-benzenesulfonamide dihydrochloride is dissolved in 30 cc. of water and 7 cc. conc. HCl, cooled to 0° C. and diazotized by the addition of 0.7 g. NaNO₂ in 5 cc. of water. After 1 hour of further stirring below 5° C. the excess HNO₂ was destroyed with sulfamic acid. In the meantime a coupler solution was prepared by dissolving 1.74 g. 3-methyl-1-phenyl-5-pyrazolone in 50 cc. of 2% NaOH and bringing to 0° C. by addition of crushed ice. The diazo was stirred in and stirred for 1.5 hours. The acid was neutralized with sodium bicarbonate, and the product filtered off and washed with water. After drying at 60° C. 4.55 g. of yellow solid which, when metallized with Ni or Co on acrylic fabric, imparts fast yellow shades.

The dye has the following formula $$\underset{(CH_3)_2N(CH_2)_3NHO_2S}{\overset{OCH_3}{\bigcirc}} \begin{array}{c} -N=N-C \\ \parallel \\ HO-C \end{array} \begin{array}{c} C-CH_3 \\ \parallel \\ N \\ | \\ C_6H_5 \end{array}$$

*Example 2*

One and eighteen hundredths grams [0.0025 m.] of the product of Example 1, 15 cc. of acetone and 2 cc. 28% NH₄OH is brought to reflux. A solution of 0.7 g. Ni[OAc]₂·4H₂O in 15 cc. of 50% aqueous acetone is added and refluxing continued for 2.5 hours. The mix was drowned in 400 cc. of water, 20 g. salt added, brought to 75° C. and allowed to cool. The solid was filtered off, washed with salt solution and air-dried. It imparts fast yellow shades to acrylonitrile copolymer fiber.

*Example 3*

Three and eight tenths grams of N-β-dimethylaminoethyl-4-methoxy-3-aminobenzenesulfonamido dihydrochloride is diazotized and coupled as in Example 1 to 0.98 g. of 3-methyl-5-pyrazolone. The metallized nickel dyeings on acrylonitrile copolymer fiber yield fast yellow shades.

*Example 4*

Three and five tenths grams of N-β-dimethylaminomethyl-4-methoxy-3-aminobenzenesulfonamide dihydrochloride are diazotized and coupled as in Example 1 to 1.75 g. of 3-amino-1-phenyl-pyrazolone. The product metallized on the acrylonitrile copolymer cloth with Ni or Co yields fast yellow dyeings.

*Example 5*

5.14 g. (0.01 mole) of the dye obtained by coupling N-γ-dimethylaminopropyl-4-methoxy-3-aminobenesulfonamide to 3-isobutyl-1-phenyl-5-pyrazolone as in Example 1, is heated to 60° C. in 100 cc. of methyl Cellosolve. A solution of 2.55 g. Ni(OCOCH₃)₂·4H₂O in 25 cc. of water is added and the solution stirred at reflux for 5 hours. After cooling it is drowned in 1500 cc. of water containing 15 cc. of 28% NH₄OH. Sodium chloride is stirred in until the dispersion is broken and the solid filtered off, washed with water and dried. The product imparts fast yellow shades to acrylonitrile polymer fibers.

*Example 6*

5.02 (0.01 mole) of the dye from the diazo of Example 5 and 3-phenyl-1-β-hydroxyethyl-5-pyrazolone is treated as in Example 5, using as the metal salt 2.55 g. of Co(OCOCH₃)₂·4H₂O. The product imparts to the fibers slightly redder shades than in Example 5.

*Example 7*

9.44 g. (0.02 mole) of the product of Example 1 is added in small portions to a freshly prepared solution of 10.8 g. CrCl₃·6H₂O in 100 cc. of ethylene glycol at 140° C. After addition the solution is stirred one hour longer at this temperature, cooled to 80° C. and poured into 220 cc. of water. The solution is made basic with NH₄OH and 30 g. of NaCl is stirred in. The product is filtered off, washed with 5% salt solution, then water and air-dried. The dye imparts fast orange shades to acrylonitrile polymer fibers.

*Example 8*

2.36 g. (0.005 mole) of the product of Example 1, 1.24 g. Cu(NO₃)₂·3H₂O, 0.26 g. Na₂CO₃ and 20 cc. of methyl Cellosolve are heated in 1 hour to reflux and stirred 4 hours at this temperature. After cooling and drowning in 100 cc. of water the product is filtered off, washed with salt solution and air-dried. Fast yellow shades are imparted to acrylonitrile polymer fibers.

What we claim is:

1. The metallized monoazo compounds, containing one atom of a metal of the class consisting of nickel, cobalt, chromium and copper, in a complex union with two moles of a dye having the following general formula.

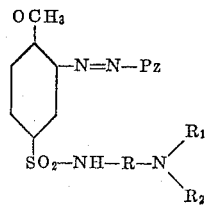

wherein
Pz = a 4-pyrazolyl-5-one radical free of carboxylic and sulfonic acid groups
R = a lower alkylene radical
$R_1$ and $R_2$ = lower alkyl radicals and together with the nitrogen atom to which they are attached represent the atoms necessary to complete a member of the class consisting of an N-morpholino radical and an N-piperidino radical.

2. The metallized monoazo compound containing one atom of nickel in a complex union with two moles of a dye having the formula

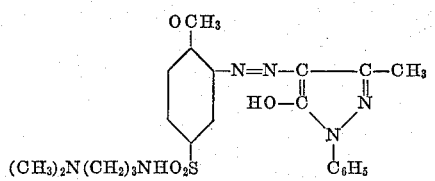

3. The metallized monoazo compound containing one atom of chromium in a complex union with two moles of the dye having the formula of claim 2.

4. The metallized monoazo compound containing one atom of copper in a complex union with two moles of the dye having the formula of claim 2.

5. The metallized azo dye containing one atom of nickel in a complex union with two moles of a dye having the formula

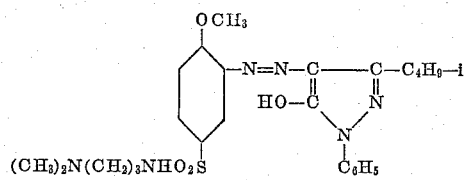

6. The metallized monoazo compound containing one atom of cobalt in complex union with two moles of a dye having the formula

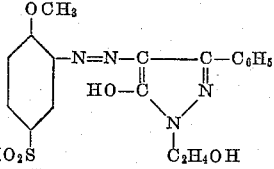

References Cited by the Examiner
UNITED STATES PATENTS

| | | | |
|---|---|---|---|
| 2,789,975 | 4/57 | Ruckstuhl | 260—147 |
| 2,816,101 | 12/57 | Brieg et al. | 260—147 |
| 3,045,003 | 7/62 | Dehnert et al. | 260—147 |

CHARLES B. PARKER, *Primary Examiner.*